UNITED STATES PATENT OFFICE.

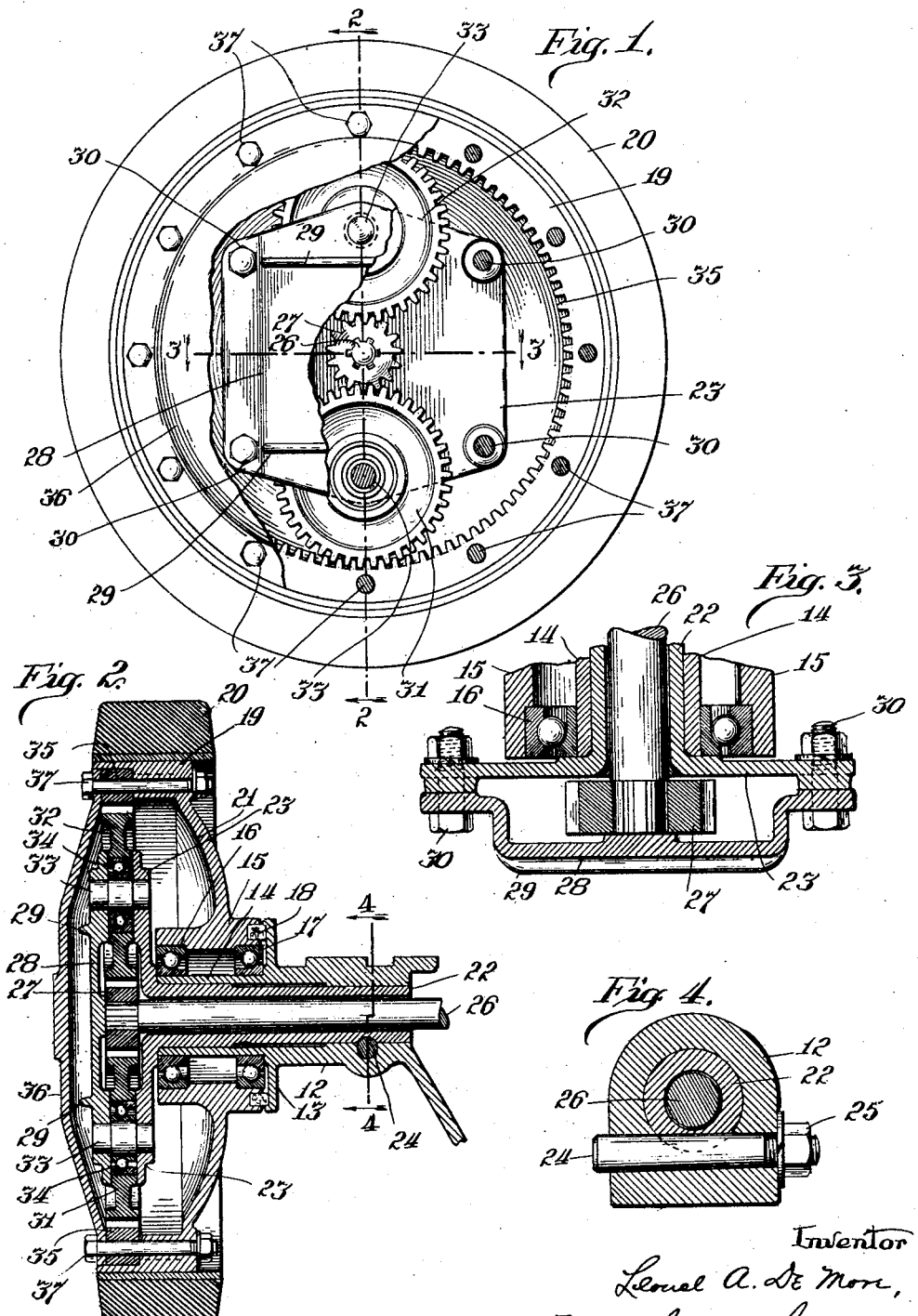

LEONEL A. DE MORE, OF OAK PARK, ILLINOIS, ASSIGNOR TO MERCURY MANUFACTURING COMPANY, OF CHICAGO, ILLINOIS, A CORPORATION OF ILLINOIS.

DRIVING MECHANISM FOR MOTOR-VEHICLES.

1,387,477. Specification of Letters Patent. Patented Aug. 16, 1921.

Application filed June 5, 1920. Serial No. 386,724.

*To all whom it may concern:*

Be it known that I, LEONEL A. DE MORE, a citizen of the United States, and a resident of Oak Park, in the county of Cook, and State of Illinois, have invented certain new and useful Improvements in Driving Mechanisms for Motor-Vehicles, of which the following is a specification, reference being had to the accompanying drawings.

My invention relates to driving mechanisms for motor vehicles and is particularly designed for use in connection with tractors. It is the object of my invention to provide a new and improved form and arrangement of parts for mounting the driving wheel in position and for transmitting power thereto, such parts being arranged so that they operate efficiently and that the mechanism can be easily dismantled when it is desired to have access to any of the working parts. The preferred means by which I have accomplished my object are illustrated in the drawings and are hereinafter specifically described. That which I believe to be new and desire to cover by this application is set forth in the claims.

In the drawings,—

Figure 1 is a side view of a driving wheel and its driving mechanism, and with certain of the parts broken away for clearness of illustration;

Fig. 2 is a central vertical section, being taken on line 2—2 of Fig. 1;

Fig. 3 is a horizontal section taken on line 3—3 of Fig. 1; and

Fig. 4 is a vertical section taken on an enlarged scale at line 4—4 of Fig. 2.

Referring to the several figures of the drawings in which corresponding parts are indicated by the same reference characters,—12 indicates a part of the framework of a motor vehicle in the form of a housing, and comprising a plate 13 at right angles to a bearing sleeve 14, such parts being formed integrally in the construction shown. 15 indicates the hub of a supporting wheel provided with antifriction bearing devices 16 and 17 respectively which are slidably mounted upon the sleeve 14 for supporting the wheel therefrom. A felt washer 18 is interposed between the hub 15 and the plate 13. The hub 15 is supported from a rim 19 provided with a tire 20 by means of an unbroken plate structure 21, the rim 19 and the hub 15 with the interposed plate 21 being formed integrally in the structure shown.

A sleeve 22 is mounted within the bearing sleeve 14 and extends well into the axle housing 12. At its outer end the sleeve 22 is provided with a supporting plate 23, in the construction shown the sleeve and plate being formed integrally. As is best shown in Fig. 2 the plate 23 bears against the antifriction bearing device 16 and thereby prevents the withdrawal of the supporting wheel from its bearing sleeve 14 while the sleeve 22 and plate 23 are in position. The sleeve 22 is removably secured firmly in position within the axle housing by means of a tapered pin 24 passing through a suitable opening formed in the sleeve and the housing as is shown in Figs. 2 and 4. The tapered pin 24 is adapted to be tightened in position and to be held removably in place by means of a nut 25.

A driving shaft 26 extends loosely through the sleeve 22, being provided upon its outer end with a pinion 27 fixedly mounted thereon. A plate 28 having strengthening ribs 29 extending across its outer face is secured to the plate 23 and in spaced relation thereto by means of bolts 30, as is best shown in Fig. 3. Mounted between the plates 23 and 28 are two intermediate gears 31 and 32 which mesh with the driving gear 27 on opposite sides thereof. The gears 31 and 32 are supported between said plates by means of shafts 33, anti-friction devices 34 of any suitable type being interposed between the gears and the shafts, as is shown in Fig. 2. The gears 31 and 32 in turn mesh with an internal gear 35 which is mounted in a suitable annular recess in the rim 19. A plate 36 on the outer face of the internal gear 35 serves to close the side of the wheel, the plate 36 and the gear 35 being held in position by a plurality of bolts 37 passing through the rim 19.

By the use of the plate 36 closing one side of the wheel, together with the plate 21 and the felt washer 18 interposed between the hub 15 and the plate 13 of the axle housing, a completely closed housing for the driving mechanism is provided, whereby the lubrication of the working parts is rendered easy. As will be understood by an inspection of the drawings, with the plate 36 and the tapered pin 24 removed, the sleeve 22 and plate 23 with the driving mechanism carried thereby are adapted to be drawn easily out of the housing 12 without disturbing the mounting of the supporting wheel thereon. Regardless of the ease with which the mechanism can be dismantled, during operation the parts are held very securely in their operative positions without danger of being disarranged in use.

What I claim as my invention and desire to secure by Letters Patent, is,—

1. The combination of a frame comprising a sleeve, a supporting wheel revolubly mounted on said sleeve, a second sleeve extending into the outer end of said first-named sleeve and readily removable outwardly therefrom, means for holding said second sleeve at all times against rotation, and means carried by said second sleeve and removable therewith for transmitting power to said supporting wheel.

2. The combination of a frame comprising a sleeve, a supporting wheel revolubly mounted on said sleeve, a second sleeve extending into the outer end of said first-named sleeve and readily removable outwardly therefrom, means for holding said second sleeve at all times against rotation, a shaft extending loosely through said second sleeve, a pinion removably carried by said shaft adjacent to the outer end of said second sleeve, and means carried by said second sleeve and readily removable therewith for transmitting power from said pinion to said supporting wheel.

3. The combination of a frame comprising a sleeve, a supporting wheel revolubly mounted on said sleeve, a second sleeve extending into the outer end of said first-named sleeve and readily removable outwardly therefrom, means for holding said second sleeve at all times against rotation, a plate formed integrally with said second sleeve on its outer end, and means carried by said plate and readily removable with said sleeve for transmitting power to said supporting wheel.

4. The combination of a frame comprising a sleeve, a supporting wheel mounted on said sleeve, antifriction bearing devices interposed between said wheel and said sleeve so arranged that the wheel with its bearings may be slipped out of engagement with the sleeve, a second sleeve mounted in said first-named sleeve, a plate carried by said second sleeve in contact with one of said bearing devices for holding the wheel against withdrawal from the first-named sleeve, and driving mechanism carried by said plate for driving said wheel.

5. In a driving mechanism of the class described, the combination of a frame comprising a sleeve provided with a fixed vertical plate at a distance from its outer end, a second sleeve non-rotatably secured within said first-named sleeve and provided at its outer end with a fixed vertical plate that lies opposite the end of the first-named sleeve, a supporting wheel mounted on said first-named sleeve, anti-friction bearing means interposed between said wheel and the first-named sleeve, said bearing means being located between said two plates, and mechanism carried by said plate of the inner sleeve for driving said wheel.

6. In a driving mechanism of the class described, the combination of a frame comprising a sleeve, a supporting wheel mounted thereon, a second sleeve secured in the first-named sleeve, a vertical plate carried by the outer end of said second sleeve, a shaft rotatably mounted in said second sleeve and projecting beyond the outer face of said plate, a pinion fast on such projecting end of the shaft, a second plate spaced from said first-named plate and rigidly connected therewith, gears rotatably mounted between said plates and in constant mesh with the pinion on said shaft, an internal gear on the rim of said wheel with which both of said last-named gears mesh, and removable means for holding said second named sleeve locked against rotation in said first-named sleeve.

LEONEL A. DE MORE.